United States Patent [19]

Krepski et al.

[11] Patent Number: 5,747,626
[45] Date of Patent: May 5, 1998

[54] SILYL TERMINATED SULFOPOLY(ESTER-URETHANE PAVEMENT MARKING COMPOSITIONS

[75] Inventors: Larry R. Krepski, White Bear Lake; Steven M. Heilmann, Afton; Daniel E. Mickus, Mahtomedi; Wayne K. Larson, Maplewood; Mark T. Gibson, Stillwater; Mark D. Purgett, Oakdale; Christopher J. Rueb, St. Paul; Howell K. Smith, II, Grant Township, all of Minn.

[73] Assignee: Minnesota Mining and Manufacturing Company, St. Paul, Minn.

[21] Appl. No.: 609,877

[22] Filed: Mar. 1, 1996

Related U.S. Application Data

[60] Provisional application No. 60/000,954, Jul. 7, 1995.
[51] Int. Cl.$^6$ .................................................. C08G 18/28
[52] U.S. Cl. ..................... 528/28; 528/30; 528/49; 525/453; 427/137
[58] Field of Search ......................... 528/28, 30, 49; 525/453; 424/588; 427/137

[56] References Cited

U.S. PATENT DOCUMENTS

| | | |
|---|---|---|
| 3,941,733 | 3/1976 | Chang .................................. 260/29.2 |
| 4,012,114 | 3/1977 | Eigenmann .............................. 350/104 |
| 4,150,946 | 4/1979 | Neel et al. .............................. 8/115.6 |
| 4,307,219 | 12/1981 | Larson ................................... 528/71 |
| 4,480,085 | 10/1984 | Larson ................................... 528/295 |
| 4,558,149 | 12/1985 | Larson ................................... 560/14 |
| 4,638,017 | 1/1987 | Larson et al. ........................... 521/157 |
| 4,738,992 | 4/1988 | Larson et al. ........................... 521/157 |
| 4,746,717 | 5/1988 | Larson ................................... 528/68 |
| 4,855,384 | 8/1989 | Larson ................................... 528/60 |
| 5,554,686 | 9/1996 | Frisch .................................... 524/588 |

FOREIGN PATENT DOCUMENTS

| | | |
|---|---|---|
| 0163214 | 12/1985 | European Pat. Off. . |
| WO/A/94/13723 | 6/1994 | WIPO . |

*Primary Examiner*—Rachel Gorr
*Attorney, Agent, or Firm*—Lorraine R. Sherman; Philip Y. Dahl

[57] ABSTRACT

A pavement marking composition comprises a sulfopoly (ester-urethane) polymer which comprises in its backbone at least one non-terminal arylene or alkylene group comprising a pendant sulfonic acid group or salt thereof, the polymer of said pavement marking composition being terminated by at least one hydrolyzable silyl group. A method of making the composition is disclosed. The pavement marking composition can further comprise at least one of pigments, optical elements, fillers, or other adjuvants. Particularly desirable adjuvants include optical elements, particularly retroreflective elements, skid-resistant particles, and pigments.

22 Claims, No Drawings

SILYL TERMINATED SULFOPOLY(ESTER-URETHANE) PAVEMENT MARKING COMPOSITIONS

CROSS-REFERENCE TO RELATED APPLICATION

This application claims priority to U.S. Provisional Patent Application No. 60/000,954, filed Jul. 7, 1995.

This invention relates to water dispersible sulfopoly(ester-urethane) compositions terminated by silyl groups and containing solubilizing sulfonate groups which aid dispersibility. The sulfopoly(ester-urethane) compositions provide materials useful as components of pavement marking compositions.

BACKGROUND OF THE INVENTION

Pavement markings are installed on roads to delineate and to provide guidance, warning, and regulatory information to motorists and pedestrians. Important characteristics of pavement markings are durability, cost, method of installation, handling and installation safety, and visibility. Included in the installation requirements of a pavement marking is the necessity of a short "no-track" time, that is, in a short period of time the material should "dry" or cure to such an extent that it will not be transferred to vehicle tires which contact it.

Because of more stringent EPA regulations regarding the amount of volatile organic compounds (VOCs) that may be allowed in liquid pavement marking materials, there has been a search for new materials to replace the solvent based chlorinated rubber and alkyd paints which were formerly widely used for marking roads. Typical VOC levels in these solvent based coatings are greater than 450 grams/liter (g/L). The new Architectural and Industrial Maintenance (AIM) Coating Rule sets a limit of 150 g/L for pavement marking materials in use during the years 1996 to 2004. After the year 2004, allowable VOC levels will drop to 100 g/L.

Liquid pavement marking materials which meet these reduced VOC requirements are waterborne acrylic paints, alkyd or hydrocarbon thermoplastics, and two part epoxies. Waterborne paints have the advantage of relatively low cost and easy application with conventional spray equipment, but lack durability, and must often be reapplied several times a year in high traffic areas. Thermoplastics and epoxies are considered to be significantly more durable than waterborne paints but are more costly, require more expensive, specialized equipment and more highly trained operators for application. Another disadvantage of epoxy pavement markings is their tendency to yellow in sunbelt regions. The high temperatures (greater than 400° F.) required to melt thermoplastic material prior to application constitute a safety hazard.

SUMMARY OF THE INVENTION

It has now been found that sulfopoly(ester-urethane)s which are terminated with silyl groups and contain solubilizing sulfonic acid functional groups are particularly useful for forming tough, weatherable films which are desired for pavement markings.

Briefly, the present invention provides pavement marking compositions comprising sulfopoly(ester-urethane)s which comprise, in their backbones, at least one non-terminal arylene or alkylene group comprising a pendant sulfonic acid group or salt thereof, the polymer being terminated by at least one hydrolyzable silyl group. In a preferred embodiment, the sulfopoly(ester-urethane)s are dispersed in water and comprise a pigment. Upon removal of water the polymers crosslink into a tough, insoluble polymer film which is weather and abrasion resistant. Each of the polymers comprises segments containing one or more hydrophilic sulfonic acid or sulfonic acid salt groups and at least one hydrophobic group containing one or more hydrolyzable silyl group at its terminus. The compositions of the invention preferably have a sulfonate equivalent weight of about 500 to about 12,000, preferably 2,000 to about 10,000 g/equivalent. The compositions preferably have a number average molecular weight less than 50,000, preferably 2,000 to less than 50,000, and more preferably 2,000 to less than 30,000, and most preferably 2,000 to less than 20,000.

In a further aspect, the invention comprises aqueous dispersions comprising up to 70 percent by weight of the sulfopoly(ester-urethane) compositions and 30 weight percent or more of solvents such as water or organic solvents (e.g., methyl ethyl ketone, acetone, and N-methylpyrrolidinone) and optionally adjuvants in amounts suitable for their intended purpose.

In a still further aspect of the invention, a process for the preparation of the sulfopoly(ester-urethane)s of the invention is provided. Preparation of the sulfopoly(ester-urethane)s involves reaction of a polyol with a polyisocyanate, optionally in the presence of any of other different diols, diamines, or bis-mercaptans, and preferably in the presence of a suitable catalyst, optionally in a non-reactant organic solvent.

In this application:

"aliphatic group" means straight chain and branched acyclic and non-aromatic cyclic hydrocarbons having up to 20 carbon atoms;

"alkyl" and "alkylene" groups mean the monovalent and divalent residues remaining after removal of one or two hydrogen atoms, respectively, from a linear or branched hydrocarbon having 1 to 20 carbon atoms;

"aromatic group" means any group having one or more unsaturated carbon rings having 5 to 12 carbon atoms;

"aromatic ester" means an ester group derived from an aryl or arylene carboxylic acid and an aliphatic alcohol;

"aryl" and "arylene" groups mean the residues remaining after the removal of one or two hydrogen atoms, respectively, from an aromatic compound (single ring and multi- and fused-rings) having 5 to 12 ring atoms and includes substituted aromatics such as lower alkaryl and aralkyl, lower alkoxy, N,N-di(lower alkyl)amino, nitro, cyano, halo, and lower alkyl carboxylic ester, wherein "lower" means $C_1$ to $C_4$;

"arylene or alkylene sulfonic acid group or salt thereof" means a group comprising at least one aromatic or hydrocarbon group substituted by at least one pendant sulfonic acid group or a salt thereof;

"cycloalkyl" and "cycloalkylene" groups mean the monovalent and divalent residues remaining after removal of one or two hydrogen atoms, respectively, from a cyclic hydrocarbon having 3 to 12 carbon atoms;

"electrophilic" refers to a compound, composition, or reagent that forms a bond to its reaction partner by accepting both bonding electrons from that reaction partner;

"group" means the specified moiety or any group containing the specified moiety (as by substitution or extension) that does not adversely affect the composition;

"lower alkyl group" means an alkyl group having 1 to 4 carbon atoms;

"molecular weight" means the sum of the atomic weights of all atoms in a group of atoms or in a segment of a polymer and under circumstances where the group or segment may be a mixture of two or more groups or segments is the number average of molecular weights of the groups or segments;

"nucleophilic" refers to a compound, composition, or reagent that forms a bond to its reaction partner by donating both bonding electrons to that reaction partner;

"polymer" includes oligomers;

"random polymer" means like groups can be located at various points along the polymer backbone and not similarly sequenced;

"silyl group" means $Si(Q)_p(OQ)_{3-p}$ where p=0, 1, or 2 wherein each Q independently can be hydrogen or a lower alkyl group having 1 to 4 carbon atoms such that an OQ group in which Q is a lower alkyl group is the hydrolyzable unit;

"sulfo group" or "sulfonate group" or "sulfonic acid group or salt thereof" means a —$SO_3M$ group where M can be H or a cation, preferably an alkali metal ion; and "sulfopoly(ester-urethane)" means a symmetric or asymmetric polymer or a random polymer comprising at least one sulfo group, at least one ester group and at least one urethane group, optionally containing other functional groups such as urea and thiocarbamate.

The presence of an ester containing the sulfonate moiety is useful in the instant polymers because it contributes amorphous character, ductility, and compatibility with coreactants and adjuvants in the composition. In addition, the ester group leads strictly to linear polymers, in contrast to amide, urea, or urethane moieties which can lead to branching via further reaction with isocyanates.

These new materials combine the safety and ease of handling of waterborne paints with the durability of the more expensive, more labor-intensive coatings like epoxies and thermoplastics.

Besides the toughness, weatherability, and abrasion resistance of the polymer films prepared from these silyl terminated sulfopoly(ester-urethane)s, another significant advantage of these new materials is that it is possible to prepare high solids dispersions (e.g., 20 to 70 weight percent) in water. The necessity of a short "no-track" time for liquid pavement marking materials is well appreciated, and the "no-track" time is reduced as the solids level increases.

Another advantage of the silyl terminated sulfopoly(ester-urethane)s is that these materials are themselves surfactant molecules, since both hydrophilic and hydrophobic groups or segments can be present in the same molecule. This accounts for the fact that aqueous dispersions of these materials are "self-stabilizing" and there is generally no need to add other surfactant materials or dispersant aids to generate stable dispersions.

A further advantage of these new materials is that bonding to both the pavement and reflective elements can be enhanced because of the presence of reactive silyl end groups such as silanol groups. Pavement and reflective elements often contain siliceous mineral components which can chemically react with the silanols of the instant sulfopoly(ester-urethane)s because of the presence of the reactive silanol groups on their surfaces.

There exists a continuing need for a pavement marking material which combines the durability of epoxy and thermoplastic materials with the safety and ease of handling of waterborne paints.

DETAILED DESCRIPTION OF THE PREFERRED EMBODIMENTS

The present invention provides water-dispersible sulfopoly(ester-urethane) compositions comprising, in their backbone at least one non-terminally disposed arylene or alkylene group comprising a pendant sulfonic acid group or salt thereof, the polymer being terminated by at least one hydrolyzable silyl group.

In a first embodiment silyl-terminated sulfopoly(ester-urethane)s of the invention of Formula I, below, are prepared by reaction of an isocyanate-terminated sulfopoly(ester-urethane) of Formula II, below, with a nucleophilic, hydrolyzable silane reagent of Formula III, below, wherein Formula I can have the structure:

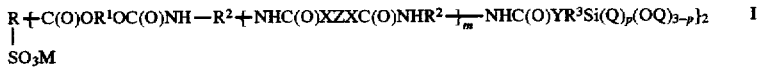

wherein
R can be a trivalent aliphatic or aromatic group in which M is a cation, preferably M is a metal cation such as Na, but M can be H, another alkali metal such as K or Li, or a primary, secondary, tertiary, or quaternary ammonium cation such as ammonium, methylammonium, butylammonium, diethylammonium, triethylammonium, tetraethylammonium, and benzyltrimethylammonium;

each $R^1$ independently can be an alkylene or cycloalkylene group such as the residue remaining after the removal of the hydroxyl groups from ethylene glycol, propylene glycol, neopentyl glycol, 2-butyl-2-ethyl-1, 3-propanediol, 1,6-hexanediol, 1,4-cyclohexanedimethanol, or a polymeric residue having a molecular weight in the range of 100 to 2,000 comprising carbon, hydrogen, and one or both of nitrogen and non-peroxidic oxygen atoms remaining after the removal of the hydroxyl groups from, for example, polypropylene glycol of molecular weight 120–2,000, polyethylene glycol of molecular weight 100–2,000, polyester diols such as polycaprolactone diol of molecular weight 300–2,000, other polyester diols such as those obtained by the reaction of alkylene diols with polymerizable lactones such as valerolactone of molecular weight 300–2,000, polyether diols such as polytetrahydrofuran of molecular weight 100–2,000, or the residue remaining after the removal of the hydroxyl groups from the polyesterification product resulting from reaction of a stoichiometric excess of a polyol with a polycarboxylic acid or the corresponding products resulting from transesterification of polycarboxylic acid lower alkyl esters of molecular weight 100 to 2,000, or the residue remaining after the removal of the hydroxyl groups from the polycondensation product resulting from reaction of a stoichiometric excess of a polyol with a polyisocyanate, the residue having a molecular weight of 100 to 2,000;

each $R^2$ independently can be an alkylene, cycloalkylene, or arylene group such as the residue remaining after removal of the isocyanate groups from polyisocyanates such as hexamethylene diisocyanate, bis(4-isocyanatocyclohexyl)methane, 1,3-bis (isocyanatomethyl)cyclohexane, isophorone diisocyanate, and 1,3-bis(1-isocyanato-1-methylethyl) benzene, or the residue remaining after removal of the isocyanate groups from isocyanates such as those described in U.S. Pat. Nos. 3,700,643 and 3,600,359, which are incorporated herein by reference, or the residue remaining after removal of the isocyanate groups from isocyanates such as those produced by trimerization reactions of diisocyanates, for example, hexamethylenediisocyanate;

each X independently can be O, S, or NR⁴, wherein each R⁴ independently is a lower alkyl group, hydrogen, or an alkylene bridging group to the other X unit, as in a piperazine group, for example;

each Q independently can be hydrogen or a lower alkyl group having 1 to 4 carbon atoms, provided that at least one OQ is an alkoxy group;

each Z independently can be selected from

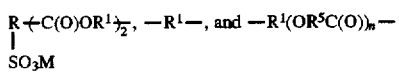

wherein R and R¹ are as previously defined, each R⁵ independently can be an alkylene group;

n can be an integer 1 to 15;

m can be 0 or an integer 1 to 10;

each R³ independently can be an alkylene group;

each Y independently can be O, S, or NR⁶ wherein R⁶ is a lower alkyl group, hydrogen, or R³Si(Q)p(OQ)₃₋ₚ wherein R³, Q and p are as previously defined.

The isocyanate terminated sulfopoly(ester-urethane)s of Formula II,

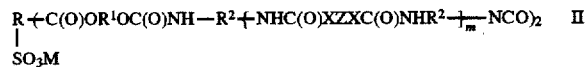

wherein R, M, R¹, R², X, m, and Z are as defined previously, are products of the reaction of a sulfoester polyol and a polyisocyanate, optionally in the presence of any of other different polyols, polyamines, or polythiols.

Sulfoester polyols can be prepared by procedures well known in the art, preferably by the reaction of one mole of sulfopolycarboxylic acid, preferably sulfoarene- or sulfoalkanedicarboxylic acid (or their corresponding lower alkyl esters) with at least two moles, preferably at least three moles, of polyol, preferably aliphatic diol, to form the preferred sulfoester diol.

Sulfoarylene- and sulfoalkylenedicarboxylic acids that may be useful for preparation of the sulfocompounds of the invention are any of the known sulfoarene- and sulfoalkanedicarboxylic acids. Examples of these include sulfoalkanedicarboxylic acids such as sulfosuccinic acid, 2-sulfoglutaric acid, 3-sulfoglutaric acid and 2-sulfododecanedioic acid, sulfoarenedicarboxylic acids such as 2-sulfoterephthalic acid, 5-sulfonaphthalene-1,4-dicarboxylic acid, and 5-sulfoisophthalic acid, which is preferred; sulfobenzylmalonic acids such as those described in U.S. Pat. No. 3,821,281; and sulfofluorene-dicarboxylic acids such as 9,9-di(2'-carboxyethyl)fluorene-2-sulfonic acid described in British Patent No. 1,006,579; all references are incorporated herein by reference. It is to be understood that the corresponding lower alkyl esters, halides, anhydrides, and salts of the above sulfonic acids can also be used in the preparation.

Aliphatic polyols useful in preparing the sulfocompounds of the invention have a molecular weight of 62 to 2000 and include, for example, monomeric and polymeric polyols preferably having two to four hydroxyl groups. Examples of the monomeric polyols include ethylene glycol, propylene glycol, butylene glycol, hexamethylene glycol, 1,1,1-trimethylolpropane, pentaerythritol, and the like. Examples of polymeric polyols include the polyoxyalkylene polyols, i.e., the diols, triols, and tetrols, the polyester diols, triols, and tetrols of organic dicarboxylic acids and polyhydric alcohols, and the polylactone diols, triols, and tetrols having a molecular weight of 106 to about 2000. Examples of polymeric polyols include polyoxyethylene diols, triols and tetrols such as the Carbowax™ polyols available from Union Carbide (Danbury, Conn.), the polyoxytetramethylenediols such as Polymeg™ polyols available from Quaker Oats Company (Chicago, Ill.), the polyester polyols such as the Multron™ poly(ethyleneadipate)polyols available from Bayer Corp. (Pittsburgh, Pa.), and the polycaprolactone polyols such as the PCP™ polyols available from Union Carbide.

Reaction of the sulfopolycarboxylic acids and polyols generally takes place in the absence of solvent, at an elevated temperature such as 180° to 250° C., and in the presence of tin or zinc catalysts. Specific conditions and amounts are exemplified in U.S. Pat. No. 4,558,149, which is incorporated by reference.

In another embodiment of the invention, the sulfopoly (ester-urethane)s can comprise alkylene sulfonic acid units in the polymer backbone. Such sulfopoly(ester-urethane)s typically are prepared using methods different from those described for the preparation of sulfopoly(ester-urethane)s comprising aromatic sulfonic acid units described above due to the lower thermal stability of hydroxy terminated dicarboxylic esters of alkyl sulfonic acids. Preferably, they can be prepared, however, by an alternative route involving the Michael addition of a bisulfite salt to an oligomer of an olefinic unsaturated dicarboxylic acid ester. These oligomers can be prepared from esters of olefinic unsaturated dicarboxylic acids using procedures similar to those described above. Subsequent Michael addition of a bisulfite salt to the olefinic unsaturation in the presence of a free radical initiator will produce an oligomer comprising the salt of alkyl sulfonic acid units in the oligomer backbone.

Olefinic dicarboxylic acids suitable for preparting sulfopoly(ester-urethane)s of the present invention include, but are not limited to, maleic acid, fumaric acid, itaconic acid, and unsaturated diol polyfunctional fatty acids (i.e., castor oil, etc.) or triglycerides of ricinoleic acid.

Representative polyisocyanates that can be used to react with the sulfoester polyols to form the isocyanate-terminated sulfopoly(ester-urethane)s are any of the well-known aliphatic and aromatic polyisocyanates. Useful polyisocyanates include hexamethylene diisocyanate, toluene diisocyanate, isophorone diisocyanate, bis(4-isocyanatocyclohexyl)methane (3,5,5-trimethyl-1-isocyanato-3-isocyanatomethylcyclohexane), 1,3-bis (isocyanatomethyl)cyclohexane, 1,3-bis(1-isocyanato-1-methylethyl)benzene, 4,4'-diphenylmethane diisocyanate (MDI), 4,4',4"-triisocyanatotriphenylmethane, and the polymethylenepolyphenylisocyanates. Other polyisocyanates are well known and include those described in U.S. Pat. Nos. 3,700,643 and 3,600,359, among many others, which are incorporated herein by reference. Mixtures of polyisocyanates can also be used such as Isonate™ 2143L, available from Dow Chemical Company (Midland, Mich.). The aliphatic polyisocyanates are preferred.

The exact nature and relative amounts of the other polyols which may be incorporated can be varied to change the properties of the final films. Suitable diols comprise those previously mentioned as useful to prepare the sulfocompound and include ethylene glycol, propylene glycol, neopentyl glycol, 2-butyl, 2- ethyl-1,3-propanediol, polypropylene glycol, polyethylene glycol, polyester diols such as polycaprolactone diol, and polyether diols such as polytetramethylenediol. Properties that can be varied include ductility, water uptake, tensile strength, modulus, abrasion resistance, minimum film formation temperature, and glass transition temperature. Longer chain polyols tend to provide materials which are more ductile and having lower Tg, whereas shorter chain polyols tend to contribute to high modulus, greater tensile strength, and having high Tg materials. Aliphatic polyols tend to provide materials with decreased water uptake whereas diols containing heteroatoms in the backbone tend to have increased water uptake.

Useful optional polyamines include: ethylenediamine, 1,6-diaminohexane, piperazine, tris(2-aminoethyl)amine, and amine terminated polyethers such as those marketed under the Jeffamine trademark by the Huntsman Corporation (Salt Lake City, Utah). Useful polythiols include 1,2-ethanedithiol, 1,4-butanedithiol, 2,2'-oxytris(ethane thiol), and di- and trimercapto propionate esters of poly (oxyethylene) diols and triols.

The reaction is carried out optionally in a water-soluble (organic) solvent unreactive with an isocyanate such as acetone, methyl ethyl ketone (MEK), tetrahydrofuran, and N-methyl-pyrrolidinone, wherein the solubility in water is at least 10 weight percent. The total concentration of sulfoester-polyol (optionally any of other different polyols, polyamines, or polythiols) and polyisocyanate, is generally desirable to be quite high such as at least 30 weight percent, preferably greater than at least 50 weight percent.

High monomer concentrations and elevated reaction temperatures of from 50° to 80° C. are desirable so that high conversions of monomers to polymer can occur in a reasonable time, e.g., less than eight hours, preferably less than three hours. Catalysts may be employed such as metal salts including dibutyltin dilaurate and dibutyltin diacetate, and amines, such as triethylamine, DBU (1,8-diazabicyclo [5.4.0]undec-7-ene) and DABCO (1,4-diazabicyclo[2.2.2] octane), in useful concentrations of from 0.01 to 1.0 mole percent (relative to the isocyanate reagent).

In this first embodiment, the ratio of polyisocyanate to polyol is adjusted such that the product of this first step of the reaction is an isocyanate terminated sulfopoly(ester-urethane) with a molecular weight of about 1,000 to 25,000. The moles of polyisocyanate preferably exceed the moles of polyol, the molar excess being preferably from 0.1 to 5, more preferably 0.5 to 2, and most preferably from 0.8 to 1.2.

In the next step of this embodiment, the isocyanate-terminated sulfopoly(ester-urethane)s of Formula II, above, are reacted with a nucleophilic, hydrolyzable silane reagent of Formula III,

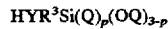   III wherein Y, $R^3$, Q, and p are as previously defined.

Useful nucleophilic, hydrolyzable silane reagents include 3-aminopropyltriethoxysilane, 3-N-methylaminopropyltrimethoxy silane, 3-mercaptopropyltrimethoxy silane, 3-hydroxypropyltriethoxysilane, and bis(3-triethoxysilyl propyl)amine. Reaction conditions are generally the same as those employed in the synthesis of the isocyanate-terminated sulfopoly(ester-urethane)s mentioned above, with the reaction period being extended from 0.5 to 2 hours.

In yet another aspect of this embodiment, compositions of Formula II may be reacted with a polyfunctional nucleophile such as water or a polyamine in less than stoichiometric amount, preferably less than 20 percent of stoichiometry, more preferably less than 5 percent of stoichiometry. This practice results in higher molecular weight isocyanate-terminated compositions. Because of multiple possibilities for polymer extensions and branching in these reactions, structural depiction is complex and cannot be reduced to a simple formula. These products, however, are useful and are deemed to fall within the scope of the present invention. The extended and branched polymers have formulae related to Formulae I and IV.

In a third step of this embodiment, water is added to convert the hydrolyzable silyl groups to silanol groups. This reaction is conveniently accomplished by adding to the silyl-terminated sulfopoly(ester-urethane) at least stoichiometric water, preferably sufficient water to form a polymer dispersion. If an organic solvent having a boiling point lower than 100° C. has been employed in the synthetic sequence thus far, the organic solvent may be evaporatively removed to leave an essentially aqueous polymer dispersion of the silanol-terminated sulfopoly(ester-urethane). The weight percent of polymer in the final aqueous dispersion is at least 20 percent, preferably at least 30 percent, and more preferably at least 50 percent. Conversely, when an organic solvent is used which has a boiling point greater than 100° C., the reaction sequence is conducted in as concentrated solution as possible, e.g., preferably equal to or less than 20 weight percent solvent. The resultant concentrated solution containing the silyl terminated sulfopoly(ester-urethane) can be effectively dispersed in water using microfluidization techniques.

Microfluidization is a process for making stable uniform sub-micron dispersions, including dispersions of sulfopoly (ester-urethane)s. The process uses high pressure liquid jet milling to combine water dispersible polymer solutions into water. The polymers generally have a viscosity in the range of 1 to 500,000 centipoises. In this process the polymer is injected into a water stream and then subjected to high pressure of 0.6 to 300 MPa (100–40,000 psi) liquid jet milling in interaction chambers. The interaction chambers which provide a high shear zone are generally configured to be explosive expansion chambers, or use high velocity impinging streams, or contain a series of orifices in series having decreasing diameters. In this process, all of the liquid is forced through the interaction chamber configurations providing uniform shear for all the material. This process provides the opportunity to make colloidal dispersions with lower VOC levels, and/or it can make particles with smaller size distributions than are produced by other processes.

Reaction Sequence I, below, shows the steps for preparing compositions of Formulae I, II, and the hydrolysis product of I which is designated I'.

Reaction Sequence I

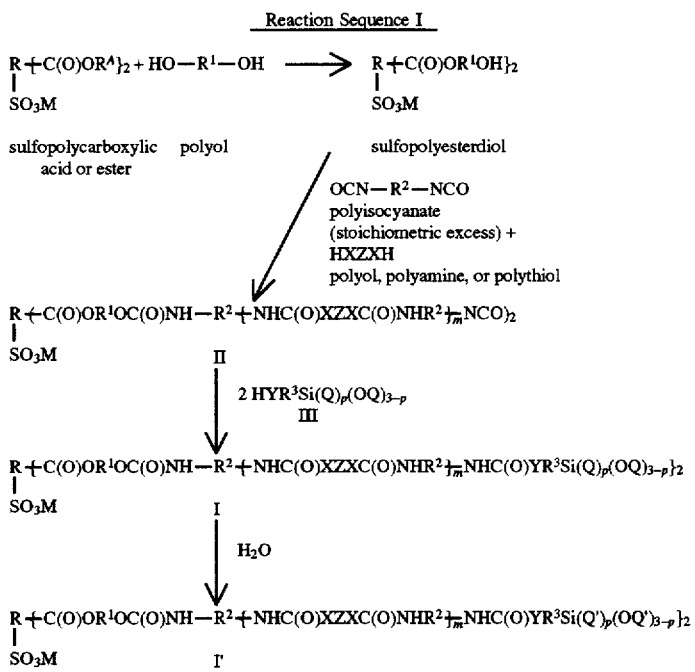

wherein
R^A independently can be hydrogen or a lower alkyl group and
R, M, $R^1$, $R^2$, $R^3$, X, Y, Z, m, Q, and p can be as previously defined,
and each Q' independently can be hydrogen or a lower alkyl group
having one to four carbon atoms, provided that at least one OQ' is
a hydroxyl group.

In a second embodiment, silyl-terminated sulfopoly(ester-urethane)s of Formula IV of the invention are prepared by reaction of a hydroxy-, amine-, or thiol-terminated sulfopoly (ester-urethane) of Formula V with an electrophilic, hydrolyzable silane reagent of Formula VIa, VIb, or VIc wherein Formula IV can have the structure:

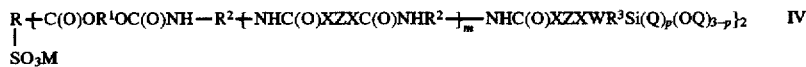

wherein each W independently can be $$-\overset{O}{\underset{\|}{C}}NH-, \quad -CH_2-\overset{OH}{\underset{|}{C}}HCH_2O-,$$

or a single bond, and
wherein R, R', $R^2$, $R^3$, M, Q, X, Z, p, and m are as previously defined.

In this second embodiment of the invention, the hydroxy-terminated sulfopoly(ester-urethane)s are preferred and are easily obtained by adjusting the stoichiometry of the polyol/polyisocyanate ratio in the first step of the reaction sequence as is described above in the first embodiment such that moles of polyol exceed those of polyisocyanate, the molar excess being preferably from 0.1 to 5, more preferably from 0.5 to 2, and most preferably from 0.8 to 1.2. The product of this reaction is the composition of Formula V:

wherein R, $R^1$, $R^2$, M, X, Z, and m are as previously defined. When the invention is practiced in this embodiment, the compositions of Formula V are reacted in a subsequent step with an electrophilic, hydrolyzable silane reagent having any of Formulae VIa, VIb, and VIc:

$$OCNR^3Si(Q)_p(OQ)_{3-p} \quad \text{VIa}$$

$$\underset{CH_2CHCH_2OR^3Si(Q)_p(OQ)_{3-p}}{\overset{O}{\diagup\diagdown}} \quad \text{VIb}$$

$$ClR^3Si(Q)_p(OQ)_{3-p} \quad \text{VIc}$$

wherein $R^3$, Q, and p are as previously defined.

Useful electrophilic, hydrolyzable silane reagents include 3-isocyanatopropyltriethoxy silane, 3-glycidoxypropyltrimethoxysilane, and 3-chloropropyltriethoxysilane.

For the practice of this second embodiment, reactants, reaction conditions, catalysts, and procedures are virtually the same as those specified with the first embodiment of the invention.

Reaction Sequence II, below, shows the steps for preparing compositions of Formula IV and V.

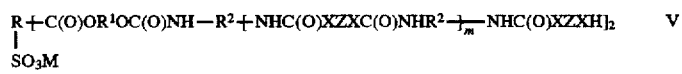

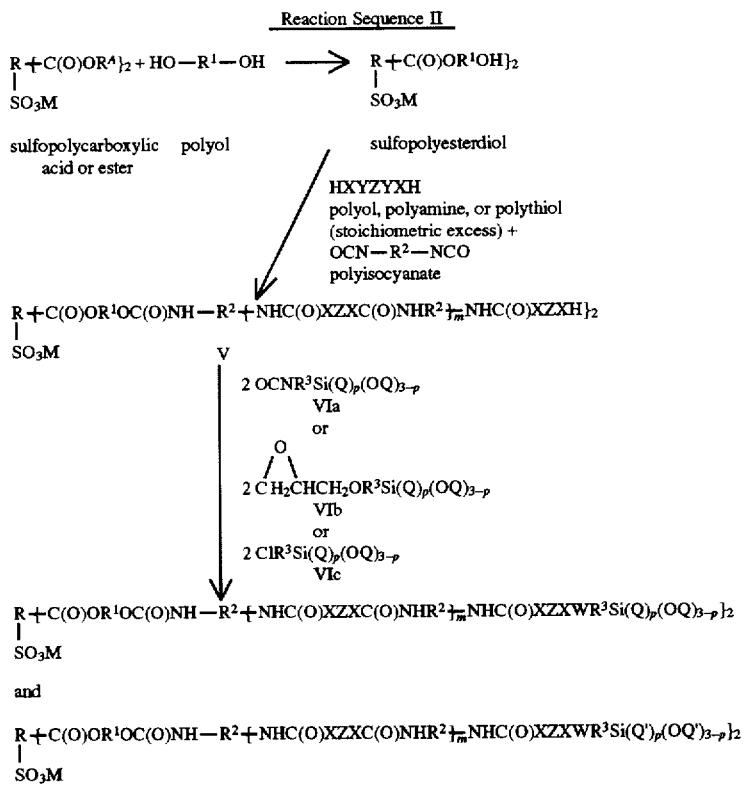

Reaction Sequence II wherein R, $R^4$, $R^1$, $R^2$, $R^3$, M, X, Y, Z, Q, Q', W, m, and p are as previously defined.

The silyl terminated sulfopoly(ester-urethane)s of the invention can be used as such to provide tough, transparent coatings. However, in order to enhance the daytime and nighttime appearance of the pavement marking, various pigments, fillers or extenders, and other adjuvants can be added. These pigments, fillers, and other adjuvants are added both for economic reasons and for obtaining desirable processing and physical properties of the final coatings, such as reflectivity, viscosity, stability, color, hardness, and durability.

To produce a white pavement marking composition, a pigment such as titanium dioxide, for example, Ti-Pure™ R-706, Ti-Pure™ R-960 (both available from DuPont, Wilmington, Del.), Kronos 2160™ or Kronos 2310™ (both available from Kronos, Inc., Houston, Tex.) can be added. To produce a yellow pavement marking composition, yellow pigments such as Hansa™ Yellow 65 or 75 (available from American Hoechst Corp., Somerville, N.J.) can be added. Pigments typically comprise 0 to 300 weight percent relative to the sulfopoly(ester-urethane).

Calcium carbonate is a common filler or extender that is used to provide body to the composition and to lower the cost. Useful types of calcium carbonate include, for example, Omyacarb™ 5 (available from OMYA, Inc. Proctor, Vt.) or various grades of calcium carbonate such as those available under the Hubercarb™ trademark from the J. M. Huber Corp., St. Louis, Mo. Other fillers include talcs such as those available under the Nytal™ trademark from the R. T. Vanderbilt Co., Norwalk, Conn., clays such as those available under the Huberm or Polyplat™ trademarks from the J. M. Huber Corp., silicas such as Aerosil™ 200 and other silicas available under the Aerosil™ trademark from the Degussa Corp., Ridgefield Park, N.J. Other useful fillers or extenders which may be incorporated into the pavement marking compositions include alumina, aluminum silicates, magnesium carbonate, calcium sulfate, and zinc oxide. Fillers typically comprise 0 to 300 weight percent relative to the sulfopoly(ester-urethane).

These pigments and fillers can be incorporated into the aqueous pavement marking compositions by utilizing conventional dispersion techniques and equipment, for example, three roll mills, ball mills, bead mills, sand mills, high speed disc dispersers, and high speed impingement mills.

Other adjuvants which can be combined with the silyl terminated poly(ester-urethane) compositions include dispersants such as Tamol™ 901 (available from Rohm and Haas Co., Philadelphia, Pa.), wetting aids or surfactants such as Surfynol™ CT-136 (available from Air Products and Chemicals, Inc., Allentown, Pa.) or Triton™ CF 10 (available from Union Carbide, Danbury, Conn.), defoamers such as Drewplus™ L-493 (available from Ashland Chemical Co., Boonton, N.J.), thixotropes or viscosity control agents such as Natrosol™ 250HR, HBR, and Plus Grade 430 thickeners (available from the Aqualon Co., Wilmington, Del.), coalescents such as 1-methyl-2-pyrrolidinone (NMP) or Texanol™ (available from Eastman Chemical Co., Kingsport, Tenn.), preservatives such as Kathon™ LX (available from Rohm and Haas) and freezing point depressants such as methanol, ethanol, or mixtures of these alcohols with propylene glycol. Effective quantities of the adjuvants preferably are less than 5 weight percent of the sulfopoly(ester-urethane).

To enhance visibility of the pavement marking, especially under low light conditions, it is advantageous to incorporate optical elements. The optical elements preferably consist of inorganic materials which are not readily susceptible to abrasion. Suitable optical elements include microspheres formed of glass, preferably having indices of refraction of from about 1.5 to about 1.9. The optical elements most widely used are made of soda-lime-silicate glasses. Although the durability is acceptable, the refractive index is only about 1.5, which greatly limits their retroreflective brightness. Higher-index glass optical elements of improved durability are taught in U.S. Pat. No. 4,367,919 which is incorporated herein by reference.

Particularly useful optical elements, because of their durability and refractive index, are microcrystalline ceramic optical elements. Preferred ceramic optical elements are disclosed in U.S. Pat. Nos. 4,564,556 and 4,758,469 which are incorporated herein by reference. These optical elements are described as solid, transparent, nonvitreous, ceramic spheroids comprising at least one crystalline phase containing at least one metal oxide. The ceramic spheroids also may have an amorphous phase such as silica. The term "nonvitreous" means that the spheroids have not been derived from a melt or mixture of raw materials capable of being brought to a liquid state at high temperatures, like glass. The spheroids are resistant to scratching and chipping, are relatively hard (above 700 Knoop hardness), and are made to have a relatively high index of refraction. These optical elements may comprise zirconia-alumina-silica or zirconia-silica.

Anti-skid particles can be incorporated into the compositions of the invention in an amount suitable for its intended purpose. Typically skid-resistant particles do not play a role in retroreflectivity; rather they are disposed on retroreflective and non-retroreflective pavement markings to improve dynamic friction between the marking and the vehicle tire. The skid-resistant particles can be, for example, ceramics such as quartz or aluminum oxide or similar abrasive media. Preferred skid-resistant particles include fired ceramic spheroids having a high alumina content as taught in U.S. Pat. Nos. 4,937,127, 5,053,253, 5,094,902, and 5,124,178, the disclosures of which are incorporated herein by reference. The particles are preferred because they do not shatter upon impact like crystalline abrasive media such as $Al_2O_3$ and quartz. Skid-resistant particles typically have sizes of about 200 to about 800 micrometers.

The silanol terminated sulfopoly(ester-urethane) compositions of the invention crosslink through the reaction of the terminal silanol groups to form Si—O—Si bonds with the elimination of a molecule of water. No volatile organic compounds (VOCs) are present before or after the oligomers are cured to form the crosslinked polymer films.

An additional advantage of these silanol terminated poly (ester-urethane) compositions is that they are themselves surfactant molecules, since both hydrophilic and hydrophobic groups or sections are present in the same molecule.

Consequently, the aqueous dispersions of these materials are "self-stabilizing" and there is no need to add other surfactant materials or dispersant aids to generate stable dispersions.

Objects and advantages of this invention are further illustrated by the following reaction sequences and examples, but the particular materials and amounts thereof recited in these examples, as well as other conditions and details, should not be construed to unduly limit this invention.

The following reaction sequence and typical experimental procedures will serve to clarify the synthesis of the silyl terminated poly(ester-urethane) compositions of the instant invention. "Me" means methyl and "Bu" means butyl. Preparation of the sulfonated diol PCPSSIP shown below is described in greater detail in U.S. Pat. No. 4,558,149, incorporated herein by reference.

Preparation of PCPSSIP Precursor

A mixture of dimethyl 5-sodiosulfoisophthalate (DMSSIP, 25.1 kg, 85 mol, available from E. I. DuPont de Nemours, Wilmington, Del.), polycaprolactonediol (PCP 0200, average molecular weight 514, 131 kg, 255 mol, available from Union Carbide Corp., Danbury, Conn.), and tetrabutyl titanate (78 g, 0.23 mol, available from Aldrich Chemical Co., Milwaukee, Wis.) was heated at 230° C. for four hours and the methanol by-product of the reaction was distilled from the reaction. After cooling to ambient temperature, an oily product comprising an approximately equal molar mixture of PCPSSIP and unreacted PCP 0200 was obtained. Reaction Sequence III shows the chemical equations involved.

The mixed PCPSSIP Precursor had a nominal hydroxy equivalent weight of about 500 g/mole (generally in the range of 450 to 600 g/mole). The hydroxy equivalent weight for the mixed precursor can vary depending on reaction conditions (e.g., temperature, rate of methanol removal, catalyst, etc.). The hydroxyl equivalent weights were determined by NMR analysis and adjusted to a preferred value for the preparation of pavement marking compositions of the present invention of approximately 475 with the addition of diethylene glycol.

In the following examples, "PCPSSIP precursor" means the mixture of PCPSSIP and PCP 0200. Unless otherwise noted, the molar ratio of PCPSSIP to PCP 0200 is approximately 1.0, and "b mole" of PCPSSIP precursor means approximately b/2 mole each of PCPSSIP and PCP 0200. In Examples 2, 16, and 19, the PCPSSIP precursor was prepared using zinc acetate (0.24 wt % based on diol charge) instead of tetrabutyl titanate.

REACTION SEQUENCE III

Synthesis of sulfonated diol

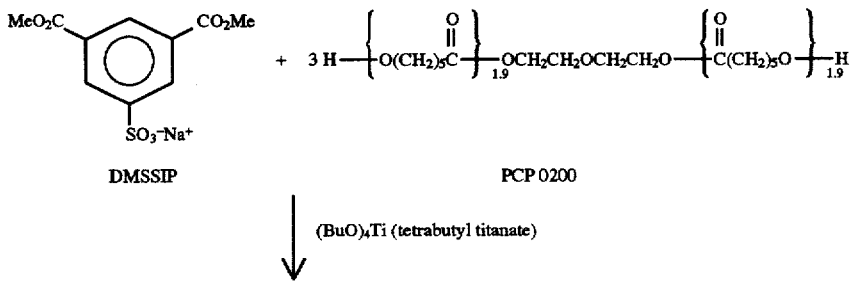

DMSSIP         PCP 0200

(BuO)₄Ti (tetrabutyl titanate)

-continued
REACTION SEQUENCE III

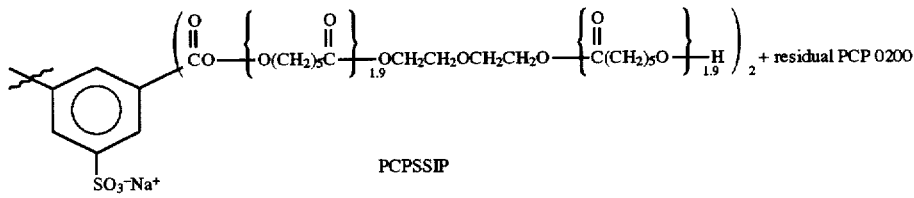

PCPSSIP

 means a second polymer chain in accordance with subscript "2" in the formula In all structures in this application, including those shown for PCP 0200 and PCPSSIP, the numbers outside the brackets refer to the average number of units.

In the Examples, the glass transition temperatures are reported as the midpoint of the change in specific heat over the transition range using an average sample heating rate of 5° C./min. The tensile properties were obtained from sample specimens with gauge lengths of 1.43 cm (0.562 inches) and strain rates of 2.54 cm/min. (1 in./min.).

Example 1

The mixed PCPSSIP precursor prepared as described above except as a 1 to 0.87 molar mixture of PCPSSIP and PCP 0200 (649.8 g, 0.64 mol based on a hydroxyl equivalent weight of 509 for the mixture), additional PCP 0200 (599.4 g, 1.16 mol), ethylene glycol (89.4 g, 1.44 mol, available from J. T. Baker, Inc., Phillipsburg, N.J.), and methyl ethyl ketone (1338 mL) was heated to 85° C. and dried by distilling methyl ethyl ketone (445 mL) from the mixture. After cooling to ambient temperature, dibutyltin dilaurate (1.53 g, 2.4 mmol, available from Alfa Chemical Co., Ward Hill, Mass.) was added to the dried solution. The dried solution was added, with stirring, to a solution of isophorone diisocyanate (800.2 g, 3.60 mol, available from Huls America, Inc. Piscataway, N.J.) in methyl ethyl ketone (533 mL), which had been heated to 72° C., at such a rate that the temperature of the reaction mixture did not exceed 85° C. After 1 hour, additional dibutyltin dilaurate (1.53 g) in methyl ethyl ketone (50 mL) was added to the solution, and the reaction mixture was maintained at 80° C., with stirring, for an additional 3.5 hours. A solution of 3-aminopropyltriethoxysilane (159.4 g, 0.72 mol, available from Aldrich Chemical Co.) in methyl ethyl ketone (100 mL) was then added to the reaction mixture which was maintained at 80° C., with stirring, for an additional 45 minutes. Water (2 L), at 80° C., was added to the reaction mixture over about a one-hour period with vigorous stirring and methyl ethyl ketone was subsequently distilled from the mixture under reduced pressure to produce a dispersion (54% solids) of a silanol terminated sulfopoly(ester-urethane) in water. Modulated Differential Scanning Calorimetry (MDSC) and tensile properties analyses made of a spun cast film of the dispersion indicated that the polymer had a Tg of 26° C. and a tensile strength of 17.9 MPa (2595 psi) at 587% elongation.

Pigment and adjuvants can be added in an amount sufficient to provide the desired color density and other characteristics.

Example 2

A silanol terminated sulfopoly(ester-urethane) was prepared substantially according to the procedure of Example 1 except that the reactants were charged as follows:

The mixed PCPSSIP precursor (37.6 g, 0.04 mol), PCP 0201 (52.4 g, 0.10 mol) (polycaprolactone diol, available from Union Carbide), ethylene glycol (7.44 g, 0.12 mol), and isophorone diisocyanate (62.2 g, 0.28 mol). The molar ratio of the reactants was 1:6:6:14. Modulated Differential Scanning Calorimetry (MDSC) and tensile properties analyses made of a spun cast film of the polymer produced by this reaction sequence indicated that the polymer had a Tg of 17° C. and a tensile strength of 30.6 MPa at 653% elongation.

In this Example and in Examples 3–5, the molar ratio relates to PCPSSIP, PCP ethylene glycol, and diisocyanate, respectively.

In Examples 3–5, below, the isocyanate utilized was bis(4-isocyanatohexyl)methane.

Example 3

A silanol terminated sulfopoly(ester-urethane) was prepared substantially according to the procedure of Example 1 except that the reactants were charged as follows:

The mixed PCPSSIP precursor (53.3 g, 0.06 mol), PCP 0201 (47.7 g, 0.09 mol), and ethylene glycol (3.7 g, 0.06 mol), and bis(4-isocyanatocyclohexyl)methane (62.9 g, 0.24 mol, $H_{12}MDI$, available from Bayer Corp., Pittsburgh, Pa.). The molar ratio of the reactants was 1:4:2:8. Modulated Differential Scanning Calorimetry (MDSC) and tensile properties analyses made of a spun cast film of the polymer produced by this reaction sequence indicated that the polymer had a Tg of 14° C. and a tensile strength of 14.7 MPa at 502% elongation.

Example 4

A silanol terminated sulfopoly(ester-urethane) was prepared substantially according to the procedure of Example 1 except that the reactants were charged as follows:

The mixed PCPSSIP precursor (56.9 g, 0.06 mol), PCP 0201 (63.6, 0.12 mol) and ethylene glycol (9.3 g, 0.15 mol) and bis(4-isocyanatocyclohexyl)methane (94.3 g, 0.36 mol). The molar ratio of the reactants was 1:5:5:12. Modulated Differential Scanning Calorimetry (MDSC) and tensile properties analyses made of a spun cast film of the polymer produced by this reaction sequence indicated that the polymer had a Tg of 36° C. and a tensile strength of 17.4 MPa at 390% elongation.

Example 5

A silanol terminated sulfopoly(ester-urethane) was prepared substantially according to the procedure of Example 1 except that the reactants were charged as follows:

The mixed PCPSSIP precursor (53.3 g, 0.06 mol), PCP 0201 (15.9 g, 0.03 mol), ethylene glycol (7.45 g, 0.12 mol), and bis(4-isocyanatocyclohexyl)methane (62.9 g, 0.24 mol).

The molar ratio of the reactants was 1:2:4:8. Modulated Differential Scanning Calorimetry (MDSC) and tensile properties analyses made of a spun cast film of the polymer produced by this reaction sequence indicated that the polymer had a Tg of 80° C. and a tensile strength of 18.2 MPa at 111% elongation.

Examples 6–10

These examples were prepared in an analogous manner to that described above for Example 1. In Examples 6 to 9, bis(4-isocyanatocyclohexyl)methane (also known as $H_{12}$MDI, available from Bayer Corp., Pittsburgh, Pa.) was substituted for isophorone diisocyanate. Properties of the polymer films cast from these examples are shown in Table I below. Pigments and adjuvants can be added in an amount sufficient to provide the desired color density and other characteristics. The data indicates that formulations of Examples 2 and 6 were particularly desirable as components of pavement marking paints.

Comparative Examples (11–14)

Film properties of some commercially available pavement marking paints and a two-part epoxy are shown below in Table I for comparison. It will be recognized that tensile strengths, elongation, and abrasion resistance of polymer films prepared from the silanol terminated sulfopoly(ester-urethane) compositions can exceed those of the comparative materials.

three hours and then cooled to room temperature, to produce an oily precursor composition comprising a 1:3 molar ratio of a sulfonated diol and a diol resulting from the reaction of 1,4-cyclohexanedimethanol (1 part) with ε-caprolactone (2 parts). The thus prepared precursor was converted to a silanol terminated sulfopoly(ester-urethane) substantially according to the procedure of Example 1 by reacting 55.9 g of the precursor with PCP 0201 (62.9 g, 0.12 mol), ethylene glycol (5.58 g, 0.09 mol), isophorone diisocyanate (79.9 g, 0.36 mol) followed by reaction with aminopropyltriethoxy silane (11.7 g, 0.053 mol). Modulated Differential Scanning Calorimetry (MDSC) and tensile properties analyses made of a spun cast film of the polymer produced by this reaction sequence indicated that the polymer had a Tg of 29° C. and a tensile strength of 28.6 NPa at 341% elongation.

The following Example teaches preparation of sulfopoly (ester-urethane)s of the second embodiment of the invention by first preparing a hydroxyl terminated sulfopoly(ester-urethane), reaction of this hydroxyl terminated sulfopoly (ester-urethane) with an electrophilic alkoxy silane reagent, and reaction of the alkoxy silane terminated sulfopoly(ester-urethane) with water.

Example 16

The mixed PCPSSIP precursor (57.33 g, 0.06 mol, with a hydroxy equivalent weight of 475), PCP 0201 (62.76 g, 0.12 mol, available from Union Carbide Corp.), ethylene glycol (9.32 g, 0.15 mol) and dibutyltin dilaurate (0.16 g, 0.25 mmol) in methyl ethyl ketone (85 mL) was heated to 80° C.

TABLE I

| Example | Sample | Tg (°C.) | Peak stress MPa | % Elon. @ break | Taber Data (weight loss, g)[b] |
|---|---|---|---|---|---|
| | PCPSSIP:PCP:EG[a] | | | | |
| 6 | 1:5:5 | 14 | 25.80 | 648 | |
| 7 | 1:5:1 | 0 | 4.40 | 241 | |
| 8 | 1:4:4 | 34 | 15.5 | 365 | 0.0199 |
| 9 | 1:3:3 | 38 | 12.9 | 330 | |
| 10 | 1:1 blend of Examples 5 and 7 | 0/80 | 9.36 | 360 | |
| Comparative Examples (commercial paints) | | | | | |
| 11 | Comparative white paint | 21 | 1.59 | 399 | 0.1064 |
| 12 | Comparative yellow paint | 9 | 2.25 | 782 | 0.1588 |
| 13 | Comparative solvent based white paint | 34 | 9.68 | 3 | 0.0638 |
| 14 | Comparative epoxy | 32/45 | 14.90 | 108 | 0.0271 |

[a]Relative ratios of PCPSSIP to PCP to ethylene glycol; relative amount of diisocyanate used was the sum of these three numbers plus one, i.e., in Example 6, 12 parts of $H_{12}$MDI were used.
[b]Taber abraser test method is ASTM C501-84.

The following Example teaches the preparation and reaction of a sulfonated polyester diol other than PCPSSIP.

Example 15

A mixture of DMSSIP (74.0 g, 0.25 mol), 1,4-cyclohexanedimethanol (180 g, 1.25 mol, available from Aldrich Chemical Co.), and tetrabutyl titanate (0.1 g, 0.3 mmol) was heated to 200° C. and maintained at that temperature, with stirring, for four hours, and then cooled to 150° C. where it was maintained, with stirring, for an additional five hours. The temperature of the reaction mixture was then increased to 180° C. and ε-caprolactone (228 g, 2.0 mol, available from Aldrich Chemical Co.) containing dibutyltin dilaurate (0.2 g, 0.3 mmol) was added to the reaction mixture, with stirring, over a period of 30 minutes. The mixture was maintained at 180° C., with stirring, for and a solution of isophorone diisocyanate (66.69 g, 0.3 mol) in methyl ethyl ketone (44 mL) added to the mixture, with stirring, at a rate such that the reaction temperature did not exceed 80° C. Approximately 30 minutes subsequent to the completion of the addition of the isophorone diisocyanate solution, dibutyltin dilaurate (0.16 g) in methyl ethyl ketone (1 mL) was added to the reaction mixture and the reaction maintained at 80° C., with stirring, for an additional 3.5 hours. A solution of isocyanatopropyltriethoxy silane (14.82 g, 0.06 mol, available from Huls America, Inc.) in methyl ethyl ketone (5 mL) was added to the reaction mixture and the mixture maintained at 80° C., with stirring, for approximately one hour. (Infrared analysis (2250 cm$^{-1}$) of the reaction mixture at this point indicated no residual isocyanate remained.) Water (260 mL) was added to the reaction mixture, with stirring, over a period of approximately ten minutes and the methyl ethyl ketone was distilled from the mixture under reduced pressure to produce a dispersion of a silanol terminated sulfopoly(ester-urethane). Modulated Differential Scanning Calorimetry (MDSC) and tensile properties analyses made of a spun cast film of the polymer produced by this reaction sequence indicated that the polymer had a Tg of 7° C. and a tensile strength of 17.9 MPa at 295% elongation.

Example 17

Dispersion of various pigments, fillers, and adjuvants were accomplished as follows: A sulfopoly(ester-urethane) prepared analogously to composition of Example 2 (177 g of a 50% solids dispersion in water) was added to a 600 mL stainless steel beaker. The beaker was mounted on a Premier Mill Model 90™ high speed dispersator (available from Premier Mill Co., Reading, Pa.) and mixing was begun with a 2.5 cm high shear head at 500 RPM. Tamol™ 681 dispersant (2.58 g, available from Rohm and Haas, Philadelphia, Pa.), Bentolite™ WH rheological modifier (0.66 g of a 15% solution in water, available from Southern Clay, Gonzales, Tex.), Surfonyl™ CT-136 surfactant (0.85 g, available from Air Products and Chemicals, Inc., Allentown, Pa.), and Drewplus™ L-493 defoamer (0.82 g, available from Ashland Chemical Co., Boonton, N.J.) were added. Titanium dioxide (Ti-Pure™ R-706, 39.27 g, available from DuPont, Wilmington, Del.) and calcium carbonate (Omyacarb™ 5, 138.04 g, available from OMYA, Inc., Proctor, Vt.) were then added. This mixture was stirred at 4800 RPM for 15 minutes, then the stirring speed was reduced to 500 RPM and the mixture was diluted with water (10 g), methanol (7.9 g), and N-methylpyrolidinone (8.79 g). Drewplus™ L-493 (0.99 g) and Natrosol™ HBR250 thickener (1.25 g of a 2.5% solution in water, available from Aqualon Co., Wilmington, Del.) were then added to yield a composition useful for pavement marking.

The following two Examples teach the preparation of a sulfopoly(ester-urethane) in 1-methyl-2-pyrrolidinone (NMP) and microfluidization of the reaction product into water.

Example 18

A solution of the mixed PCPSSIP precursor (95.0 g, 0.1 mol), PCP 0201 (78.6 g, 0.15 mol), ethylene glycol (12.4 g, 0.20 mol), dibutyltin dilaurate (0.16 g, 0.00025 mol), and NMP (57.7 g) was prepared by heating the reagents together at 60° C. This solution was added to isophorone diisocyanate (111 g, 0.50 mol) contained in a 1000 mL flask at such a rate that the temperature was maintained between 70° C. and 75° C. Five minutes after the end of the addition another 0.16 g of dibutyltin dilaurate was added and the temperature was maintained between 77° C. and 86° C. for another 40 minutes. Then a solution of 3-aminopropyltriethoxysilane (22.1 g, 0.10 mol) in 22.1 g of NMP was added in a stream. The addition caused an immediate exotherm to 94° C. Stirring was continued for another hour while the temperature was maintained between 85° C. and 95° C., then the reaction mixture was transferred to a wide mouth glass jar, the jar was sealed, and the product was allowed to cool to room temperature.

Example 19

The apparatus providing the high pressure liquid jet milling in this example was a Microfluidizer™ Model M-110F (Microfluidics, Newton, Mass.) equipped with a 400 μm expansion chamber and a 200 μm expansion chamber in series. The maximum pressure reached was 55 MPa (8000 psi). The microfluidizer in this configuration had a flow rate of 600 mL/min. The average particle sizes of the polymer dispersions were determined by dynamic light scattering using a Malvern PCS 4700 (Malvern, Southborough, Mass.).

NMP solution (95.3 g) of the sulfopoly(ester-urethane) of Example 18 was preheated to 80° C. and loaded into a caulking gun. Then, 240 g of deionized distilled water (85° C.) was circulated through the microfluidizer at 55 NPa (8000 psi). The NMP solution was injected steadily into the water stream, just before the high pressure pump, over a 10 minute period (9.53 g/min). The high shear and intimate mixing provided in the chambers caused a colloidal dispersion of the sulfopoly(ester-urethane) particles to form immediately after the sulfopoly(ester-urethane) and water exited from the interaction chambers. The dispersion was allowed to circulate through the microfluidizer as the solids content built to its final value of 28 wt % sulfopoly(ester-urethane) and NMP (approximately 17 total passes). The particle size of this dispersion was determined to be 93 nm and was constant over the time of the experiment. In addition, the dispersion contained no undispersed sulfopoly(ester-urethane) or settled material. By contrast, a dispersion prepared by mixing 20 g of an 80% solution of the sulfopoly (ester-urethane) of Example 18 in NMP (80° C.) with 240 g preheated water (85° C.) using a high speed dispersator and a Cowles blade (3000 RPM) for 15 minutes resulted in a poor dispersion. The dispersion contained undispersed sulfopoly(ester-urethane) which quickly settled to the bottom of the container. The sulfopoly(ester-urethane) particles that did form a dispersion had an average particle size of 176 nm. This example showed the applicability of using high pressure liquid jet milling to disperse the sulfopoly(ester-urethane) into water to form a stable waterborne dispersion with better properties than standard high shear mixing.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A paint comprising a sulfopoly(ester-urethane) polymer which comprises in its backbone at least one non-terminal arylene or alkylene group comprising a pendant sulfonic acid group or salt thereof, and a pigment, said sulfonic acid group or salt thereof having the formula

wherein R is a trivalent aliphatic or aromatic group and M is a cation, said aliphatic or aromatic group being bonded directly to ester groups, the polymer of said paint being terminated by at least one hydrolyzable silyl group, and said paint being an aqueous dispersion.

2. The paint according to claim 1 further comprising at least one of an optical element, skid-resistant particle, and filler.

3. The paint according to claim 1 wherein the silyl group of said polymer has the formula $Si(Q)_p(OQ)_{3-p}$ where p=0, 1, or 2 and wherein each Q independently is hydrogen or a lower alkyl group having 1 to 4 carbon atoms such that the OQ group, in which Q is a lower alkyl group, is the hydrolyzable unit.

4. The paint according to claim 1 wherein said polymer has a sulfonate equivalent weight in the range of 500 to 12,000 g/equivalent.

5. The paint according to claim 1 wherein said polymer has a number average molecular weight less than 50,000.

6. The paint according to claim 1 wherein said poly(ester-urethane) is present in an amount up to 70 percent or more by weight and said aqueous medium comprises 30 weight percent of said composition.

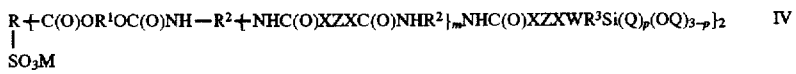

7. A paint having Formula I or IV, and hydrolysis products thereof, wherein Formula I is:

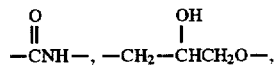

or a single bond, and

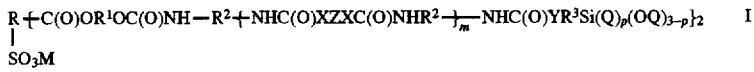

wherein
R is a trivalent aliphatic or aromatic group in which M is a cation;

each $R^1$ independently is an alkylene or cycloalkylene group having a number average molecular weight in the range of 100 to 2,000; or a polymeric residue having a molecular weight in the range of 100 to 2,000 comprising carbon, hydrogen, and one or both of nitrogen and non-peroxidic oxygen atoms;

each $R^2$ independently is an alkylene, cycloalkylene, or arylene group;

each X independently is O, S, or $NR^4$, wherein each $R^4$ independently is a lower alkyl group, hydrogen, or an alkylene group bridging to the X group;

m is an integer 0 to 10;

each Z independently is selected from the group consisting of

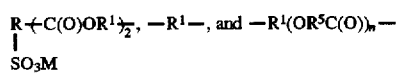

wherein R and $R^1$ are as previously defined,
each $R^5$ independently can be an alkylene group;
p is 0, 1, or 2;
n is an integer 1 to 15;
each $R^3$ independently is an alkylene group; and
each Y independently is O, S, or $NR^6$
wherein $R^6$ is a lower alkyl group, hydrogen, or $R^3Si$ $(Q)_p(OQ)_{3-p}$,
wherein $R^3$ and p are as previously defined, and each Q independently is hydrogen or a lower alkyl group having 1 to 4 carbon atoms provided that at least one OQ is an alkoxy group; and
wherein formula IV is wherein
each W independently is

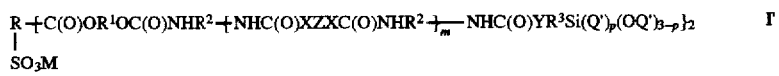

wherein R, $R^1$, $R^2$, $R^3$, M, Q, X, Z, p, and m are as previously defined.

8. The paint according to claim 7 wherein the hydrolysis products thereof have Formula I' and IV', wherein Formula I' is

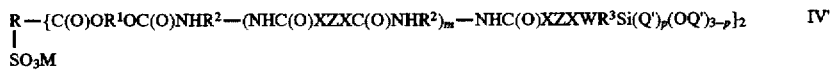

and Formula IV' is wherein
each Q' independently can be hydrogen or a lower alkyl group having 1 to 4 carbon atoms, provided that at least one OQ' is an hydroxyl group; and
wherein R, $R^1$, $R^2$, $R^3$, M, X, Y, Z, W, m, and p are as previously defined.

9. The paint according to claim 1 wherein said dispersion is produced using a microfluidization process.

10. A pavement marking paint comprising
a) an aqueous dispersion comprising a poly(ester-urethane) polymer having in its backbone at least one non-terminal arylene or alkylene group comprising a pendant sulfonic acid group or salt thereof, the arylene or alkylene portion of said sulfonic acid group or salt thereof comprising two ester groups covalently bonded thereto, the polymer of said pavement marking composition being terminated by at least one hydrolyzable silyl group, and
b) an effective amount of at least one pigment.

11. The pavement marking paint according to claim 10 further comprising one or both of optical elements and skid-resistant particles.

12. The pavement marking paint according to claim 10 further comprising at least one filler or extender.

13. The pavement marking paint according to claim 10 from which the aqueous medium has been removed.

14. The pavement marking paint according to claim 11 wherein said optical element is a retroreflective element.

15. A method comprising the step of
applying to a pavement a dispersion including a poly(ester-urethane) polymer which comprises in its backbone at least one non-terminal arylene or alkylene group comprising a pendant sulfonic acid group or salt thereof, the arylene or alkylene portion of said sulfonic acid group or salt thereof comprising two ester groups covalently bonded thereto, said poly(ester-urethane) composition being terminated by at least one hydrolyzable silyl group, said dispersion optionally further comprising at least one of pigments, optical elements, skid-resistant particles, and fillers.

16. The method according to claim 15 further comprising the step of drying said dispersion to produce a coating of poly(ester-urethane) on said pavement.

17. The method according to claim 15 wherein said optical element is a retroreflective element.

18. The method according to claim 15 further comprising the step of adding optical elements to said dispersion after application of said polymer to said pavement.

19. A method for preparing a silyl terminated sulfopoly(ester-urethane) comprising the steps of (a) reacting an isocyanate terminated sulfopoly(ester-urethane) of formula II

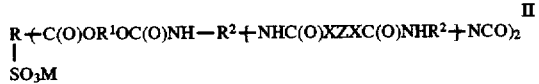
II wherein R is a trivalent aliphatic or aromatic group in which M is a cation;

each R' independently is an alkylene or cycloalkylene group having a number average molecular weight in the range of 100 to 2,000; or a polymeric residue having a molecular weight in the range of 100 to 2,000 comprising carbon, hydrogen, and one or both of nitrogen and non-peroxidic oxygen atoms;

each $R^2$ independently is an alkylene, cycloalkylene, or arylene group;

each X independently is O, S, or $NR^4$, wherein each $R^4$ independently is a lower alkyl group, hydrogen, or an alkylene bridging group to the other X unit;

each Z independently is selected from

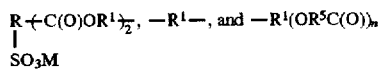

wherein R and $R^1$ are as previously defined,
each $R^5$ independently is an alkylene group;
p is 0, 1, or 2;
m is an integer 0 to 10;
with a nucleophilic hydrolyzable silane agent of formula III $HYR^3Si(Q)_p(OQ)_{3-p}$   III wherein each $R^3$ independently is an alkylene group;
each Y independently is O, S, or $NR^6$
wherein $R^6$ is a lower alkyl group, hydrogen, or $R^3Si(Q)_p(OQ)_{3-p}$
wherein $R^3$ is as previously defined,
each Q independently is hydrogen or a lower alkyl group having 1 to 4 carbon atoms, provided that at least one OQ is an alkoxy group; and p is as previously defined;

to produce 1) said silyl terminated sulfopoly(ester-urethane) of formula I

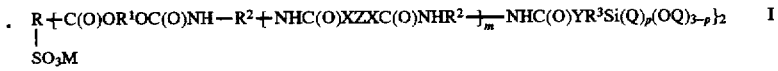   I wherein R, M, $R^2$, $R^1$, X, Z, Y, $R^3$, Q, m, and p are as previously defined or 2) a silyl terminated sulfopoly(ester-urethane) having a formula related to formula I in which polymer extensions or branching have taken place.

20. A method for producing a silyl terminated sulfopoly(ester-urethane) of formula IV comprising the steps of (a) reacting a hydroxy-, amino-, or thiol-terminated sulfopoly(ester-urethane) of formula V

   V wherein R, $R^1$, $R^2$, M, X, Z, and m are as previously defined, with an electrophilic hydrolyzable silane reagent having any of formulae VIa, VIb, and VIc:

$OCNR^3Si(Q)_p(OQ)_{3-p}$   VIa $OCNR^3Si(Q)_p(OQ)_{3-p}$   VIa $\overset{O}{\underset{}{\triangle}}$
$CH_2CHCH_2OR^3Si(Q)_p(OQ)_{3-p}$   VIb $ClR^3Si(Q)_p(OQ)_{3-p}$   VIc $ClR^3Si(Q)_p(OQ)_{3-p}$   VIc wherein $R^3$, Q, and p are as previously defined, to produce
1) said silyl terminated sulfopoly(ester-urethane) of formula IV:

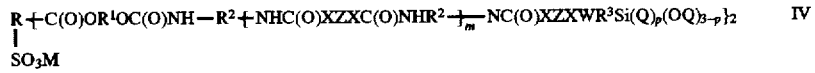   IV wherein each W independently is

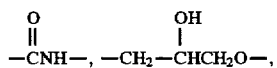

or a single bond, and
wherein R, $R^1$, $R^2$, $R^3$, M, Q, X, Z, p, and m are as previously defined, or 2) a silyl terminated sulfopoly(ester-urethane) having a formula related to formula IV in which polymer extensions or branching subsequent to reaction with a polyfunctional nucleophile have taken place.

21. The paint according to claim 1 which is a pavement marking paint.

22. The paint according to claim 1 from which said aqueous medium has been removed.

* * * * *

UNITED STATES PATENT AND TRADEMARK OFFICE
CERTIFICATE OF CORRECTION

PATENT NO. : 5,747,626
DATED : May 5, 1998
INVENTOR(S) : Krepski, Larry R.

It is certified that error appears in the above-identified patent and that said Letters Patent is hereby corrected as shown below:

Title page, Item [54] and Column 1, line 1,
Title, "SILYL TERMINATED SULFOPOLY(ESTER-URETHANE PAVEMENT MARKING COMPOSITIONS" should read -- SILYL TERMINATED SULFOPOLY(ESTER-URETHANE) PAVEMENT MARKING COMPOSITIONS --

Column 2,
Line 38, "I to 20" should read -- 1 to 20 --

Column 11,
Lines 24-33, delete the following 2 formulas at the end of Reaction Sequence II:

and

insert the following 2 formulas at the end of Reaction Sequence II:

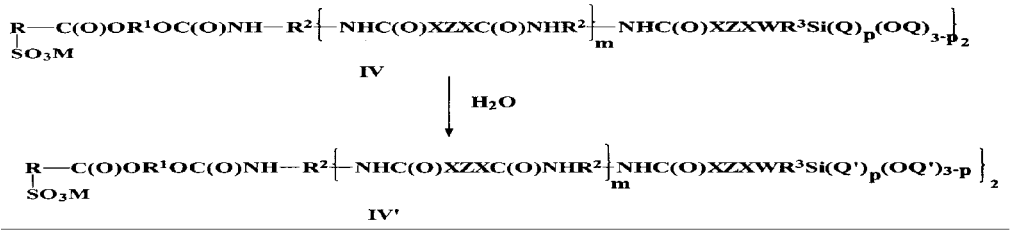

Column 18,
Line 15, "NPa" should read -- MPa --

Column 20,
Line 8, "NPa" should read -- MPa --
Line 67, "70 percent or more" should read -- 70 percent --

Column 21,
Line 2, "percent of" should read -- percent or more of --
Line 9, "Formula" should read -- Formulae --

UNITED STATES PATENT AND TRADEMARK OFFICE
CERTIFICATE OF CORRECTION

PATENT NO.   : 5,747,626
DATED        : May 5, 1998
INVENTOR(S)  : Krepski, Larry R.

Page 2 of 3

It is certified that error appears in the above-identified patent and that said Letters Patent is hereby corrected as shown below:

Column 23,
Line 33, $$R\text{-}\{C(O)OR^1OC(O)NH\text{---}R^2\text{-}\{NHC(O)XZXC(O)NHR^2\text{-}\}\text{---}NCO\}_2 \quad\quad II$$
$$\quad\quad | $$
$$SO_3M$$

should read $$R\text{-}\{C(O)OR^1OC(O)NH\text{---}R^2\text{-}\{NHC(O)XZXC(O)NHR^2\text{-}\}_m\text{---}NCO\}_2 \quad\quad II$$
$$\quad | $$
$$SO_3M$$

Line 45, "each R'" should read -- each $R^1$ --

Column 24,
Line 3, $$R\text{-}\{C(O)OR^1\}_2\text{---}, \text{---}R^1\text{---}, \text{ and } R^1(OR^5C(O))_n$$
$$\quad | $$
$$SO_3M$$

should read $$R\text{-}\{C(O)OR^1\}_2\text{---}, \text{---}R^1\text{---}, \text{ and } R^1(OR^5C(O))_n$$
$$\quad | $$
$$SO_3M$$

Line 8, "1,or2;" should read -- 1, or 2; --
Line 40, $$R\text{-}\{C(O)OR^1OC(O)NH\text{---}R^2\text{-}(NHC(O)XZXC(O)NHR^2)_m\text{-}NHC(O)XZXH\}_2 \quad\quad V$$
$$| $$
$$SO_3M$$

should read $$R\text{-}\{C(O)OR^1OC(O)NHR^2\text{-}(NHC(O)XZXC(O)NHR^2)_m\text{-}NHC(O)XZXH\}_2 \quad\quad V$$
$$| $$
$$SO_3M$$

Line 49, delete the complete line/formula.

" $OCNR^3Si(Q)_p(OQ)_{3-p}$    VIa "

UNITED STATES PATENT AND TRADEMARK OFFICE
CERTIFICATE OF CORRECTION

PATENT NO. : 5,747,626  
DATED : May 5, 1998  
INVENTOR(S) : Krepski, Larry R.

It is certified that error appears in the above-identified patent and that said Letters Patent is hereby corrected as shown below:

Column 24 (cont'd),
Line 57, delete the complete line/formula.

" $ClR^3Si(Q)_p(OQ)_{3-p}$         VIc "

Signed and Sealed this

Twenty-fourth Day of August, 2004

JON W. DUDAS  
*Director of the United States Patent and Trademark Office*